UNITED STATES PATENT OFFICE.

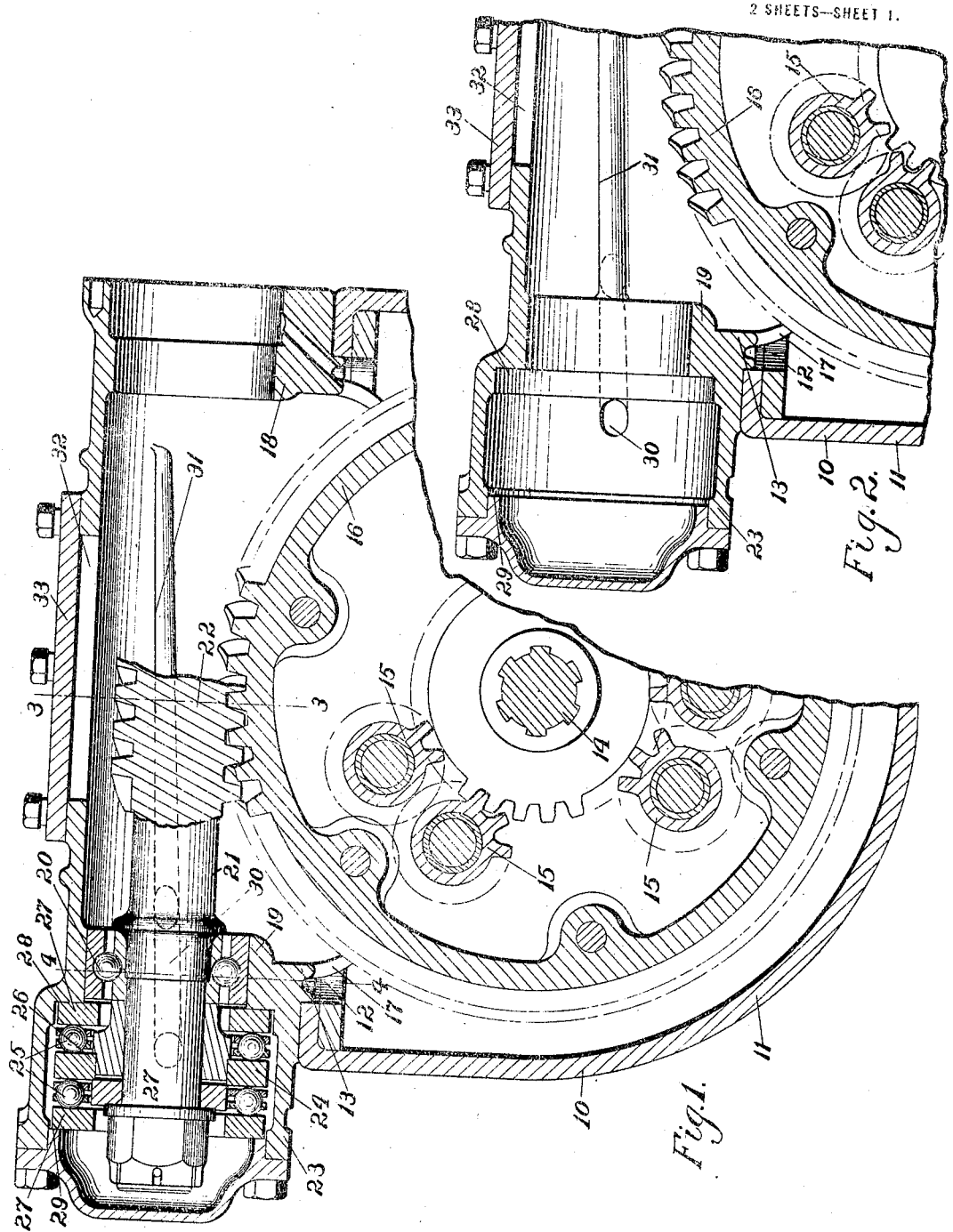

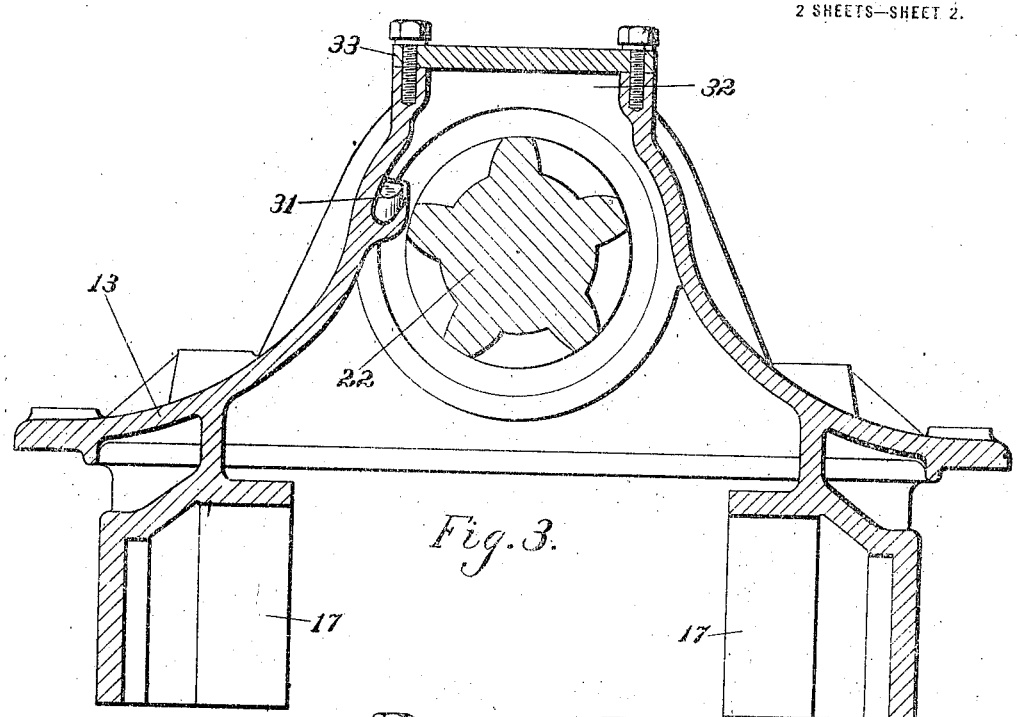
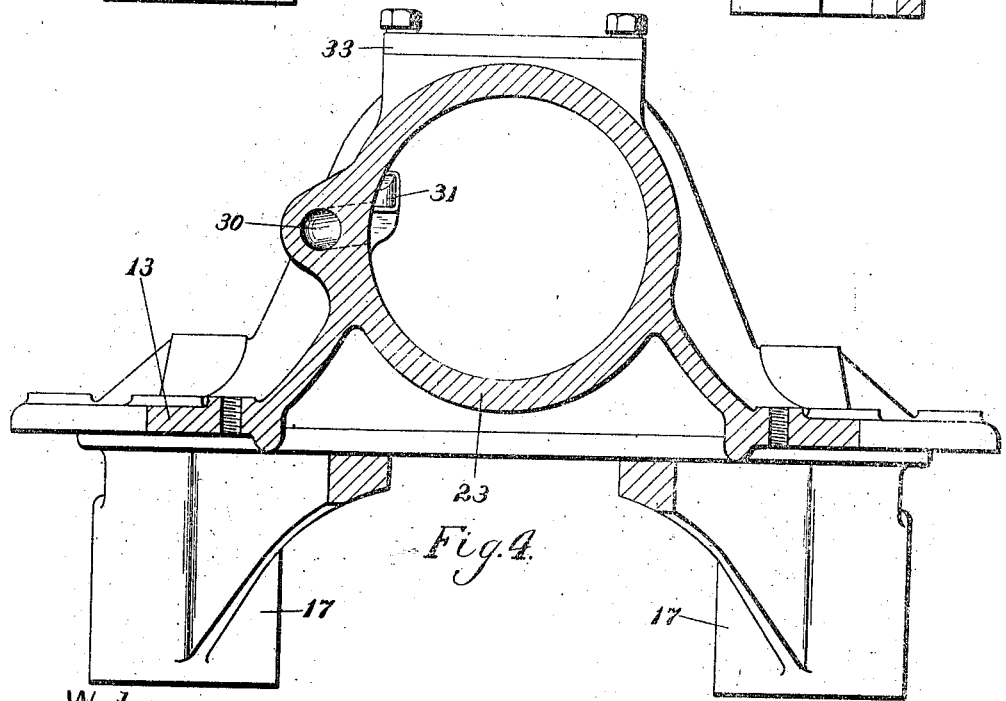

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

AXLE.

1,278,856.  Specification of Letters Patent.  Patented Sept. 17, 1918.

Application filed October 17, 1913. Serial No. 795,748.

*To all whom it may concern:*

Be it known that I, HAROLD D. CHURCH, a citizen of the United States, and resident of Detroit, Wayne county, State of Michigan, have invented certain new and useful improvements in Axles, of which the following is a specification.

This invention relates to motor vehicles and particularly to the driving axle construction thereof.

In driving axle construction it is essential that all of the gears and bearings should be well lubricated and particularly is this true of worm and worm wheel driving gears. The present invention is shown as applied to a worm and worm wheel driving axle, but it is obvious that some of the features of the invention are as well adapted to other types of axles.

One of the objects of the present invention is to provide a driving axle with means for supplying lubricant from one of the gears to one of the bearings.

Another object of the invention is to provide a rear axle having a driving shaft therein and supported in suitable bearings with means for supplying oil from the gear on said driving shaft at one side of said bearings to the thrust bearings at the other side of said supporting bearings.

Another object of the invention is to supply lubricant from the main casing of a rear axle to the thrust bearings of the axle driving shaft when said thrust bearings are mounted in a housing which is beyond one of the supporting bearings of said driving shaft.

Other objects of the invention will appear from the following description taken in connection with the drawings which form a part of this specification, and in which:

Figure 1 is a transverse section through a motor vehicle rear axle embodying this invention;

Fig. 2 is a view similar to Fig. 1 of a part of such axle casing with the driving shaft and bearings removed;

Fig. 3 is a section substantially on the line 3—3 of Fig. 1; and

Fig. 4 is a section substantially on the line 4—4 of Fig. 1, with the driving shaft and bearings removed.

Referring to the drawings, 10 represents the main axle casing which is formed as shown of a lower portion 11 having an opening 12 at the top and a cover 13 which closes said opening and is provided with various supports for the bearings of the axle and driving shaft as hereinafter more fully described.

One of the sections of the vehicle driving axle is shown at 14 and some of the differential gears are represented at 15 in Figs. 1 and 2, and the driven gear or worm wheel 16 is shown as secured to and driving the differential gears 15.

The above described differential mechanism and driven gear 16 are mounted in suitable bearings in downwardly projecting lugs 17 which are shown particularly in Figs. 3 and 4 as formed integral with the cover 13.

The cover 13 is formed with suitable alined supports 18 and 19 at the front and rear of the casing 10 respectively. These supports are for the radial bearings 20 of the driving shaft 21, only the rear bearing being shown in the drawings. The driving shaft 21 extends into the casing 10 as shown and is formed with a worm 22 which meshes with worm wheel 16 and which is arranged forward of the supporting bearing 20 shown in Fig. 1. Beyond the bearing 20 and in a housing 23 which is formed as an integral extension of the upper part of the casing 10, is a thrust bearing 24 which as shown in the drawing, is adapted to take the thrust of the driving shaft 21 in both directions. That is, this thrust bearing 24 is provided with two series of balls 25 on opposite sides of a ring 26 which is secured firmly to the shaft 21. The balls 25 of course operate on suitable bearing rings 27 which abut against shoulders 28 and 29 on the housing 23.

It will be understood that in worm gearing of this character, there is considerable thrust upon the driving shaft 21, in a rearward direction when the vehicle is moving forwardly and in a forward direction when the vehicle is being driven in the reverse direction. Therefore the thrust bearing 24 must receive plenty of lubricant in order to prevent it from wearing or becoming heated. Also it will be understood that it is desirable to place the supporting bearings 20 as close to the worm 22 as possible in order to preserve the alinement thereof, and this requires that the thrust bearing 24 be placed beyond the supporting bearing 20 as shown in the drawings. This position of the thrust bearing 24 removes it considerably from the body of lubricant which is contained in the casing 10 and the bearing 24 would therefore not receive sufficient lubricant if some special means were not provided for that purpose.

The present invention provides means for feeding oil to the housing 23 or the thrust bearing 24 by means of a conduit which is shown as slightly inclined downwardly toward the housing 23 and extending into said housing around the supporting bearing 20. This conduit is represented at 30 in the drawings and its forward part is in the form of a trough 31 which is shown as an integral part of the cover part 13 of the casing 10 and as extending alongside of the worm 22 so that the thick lubricant which clings to the worm will be scraped off of the worm as the latter revolves. The lubricant thus falling into the trough 31 will run down through the part of the conduit 30 that extends around the bearing 20 and into the housing 23 where it will be taken up by the thrust bearings 24 and then led to the bearing 20. Surplus lubricant will flow through the bearing 20 and back into the casing 10. Thus the lubricant returns to the bottom of the casing 10 and is lifted by the worm wheel 16 to the worm 22 and from there again scraped off into the trough 31. There is therefore, a constant circulation of lubricant in the casing and all of the parts of the differential and driving gears and bearings are amply lubricated.

The cover portion 13 of the casing 10 is provided with a top opening 32 just above the worm 22 which thereby gives access to the worm and to the conduit 30 for cleaning out the latter. This opening 32 is closed by a removable cover 33 as shown in the drawings.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:—

1. In a motor vehicle, the combination of an axle casing having a supporting bearing therein, and a driving shaft extending into the casing and supported in said bearing, a gear on said shaft on one side of said bearing, a thrust bearing on the other side thereof, and means for supplying said gear with lubricant, said casing having an inclined conduit, one end adjacent the gear, to remove lubricant therefrom, and the other end adjacent the thrust bearing to convey the removed lubricant thereto.

2. In a motor vehicle, the combination of an axle casing, having a supporting bearing therein, and a driving shaft extending into the casing and supported in said bearing, a gear on said shaft on one side of said bearing, a thrust bearing on the other side thereof, and means for supplying said gear with lubricant, said casing having an inclined conduit formed in its walls around the supporting bearing, one end adjacent the gear, to remove lubricant therefrom, and the other end adjacent the thrust bearing to convey the removed lubricant thereto.

3. In a motor vehicle, the combination of an axle casing having thrust and supporting bearings therein, and a driving shaft extending into the casing and acting against said bearings, a gear on said shaft, and means for supplying said gear with lubricant, and said casing having an inclined conduit, one end adjacent the gear to remove lubricant therefrom and the other end adjacent said bearings to convey the removed lubricant thereto.

4. In a motor vehicle, the combination of an axle casing, a worm wheel mounted therein, a driving shaft extending into the casing above said wheel and having a worm in mesh therewith, a bearing in said casing for said driving shaft, and an inclined conduit having a part in the shape of a trough extending alongside of said worm to scrape off the lubricant therefrom and a part extending to said bearing to carry lubricant thereto.

5. In a motor vehicle, the combination of an axle casing, a worm wheel mounted therein, a driving shaft extending into the casing above said wheel and having a worm in mesh therewith, a bearing in said casing for said driving shaft, and a conduit having a part in the shape of a trough extending alongside of said worm to scrape off the lubricant therefrom, and a part extending around the bearing to deliver the lubricant to the farther side thereof.

In testimony whereof I affix my signature in the presence of two witnesses.

HAROLD D. CHURCH.

Witnesses;
F. H. MAISONVILLE,
LE ROI J. WILLIAMS.